US012549454B2

(12) United States Patent
Kojukhov et al.

(10) Patent No.: US 12,549,454 B2
(45) Date of Patent: Feb. 10, 2026

(54) SYSTEM, METHOD, AND COMPUTER PROGRAM FOR A TOSCA MODELING OPTIMIZATION FOR 5G NETWORK ORCHESTRATION

(71) Applicant: Amdocs Development Limited, Limassol (CY)

(72) Inventors: Andrei Kojukhov, Rishon le Zion (IL); Avi Chapnick, Ramat Gan (IL); Borislav Glozman, Ramat Gan (IL); Gabriel Podolsky, Nesher (IL); Amit Gal, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 357 days.

(21) Appl. No.: 18/124,488

(22) Filed: Mar. 21, 2023

(65) Prior Publication Data

US 2024/0323101 A1 Sep. 26, 2024

(51) Int. Cl.
*H04L 41/40* (2022.01)
*H04L 41/084* (2022.01)

(52) U.S. Cl.
CPC .......... *H04L 41/40* (2022.05); *H04L 41/0843* (2013.01)

(58) Field of Classification Search
CPC ............. H04L 41/5054; H04L 43/0817; H04L 41/0654; H04L 41/044; H04W 24/04; H04W 24/02; H04W 16/02; G06F 9/45558
See application file for complete search history.

(56) References Cited

U.S. PATENT DOCUMENTS

2018/0316615 A1* 11/2018 Shaw .................. H04L 41/0806
2018/0332485 A1* 11/2018 Senarath ............... H04L 41/044
2019/0052549 A1* 2/2019 Duggal .............. G06Q 30/0635
2019/0109768 A1 4/2019 Senarath et al.
2021/0306235 A1* 9/2021 Al-Dulaimi ......... H04L 41/5054
2021/0360083 A1* 11/2021 Duggal ................... H04L 67/34
2022/0083392 A1 3/2022 Hofer et al.
2024/0305533 A1* 9/2024 Bai ...................... H04W 24/02

FOREIGN PATENT DOCUMENTS

CN 110546920 B 4/2021

OTHER PUBLICATIONS

International Search Report and Written Opinion from PCT Application No. PCT/IB2024/052676, dated Jun. 10, 2024, 12 pages.
Kahn et al., "Deliverable D2.1 5G-VINNI Solution facility sites High Level Design (HLD)—v1 Norway Facility Site Annex (Release 4)," 5G-VINNI consortium, 2021, 184 pages, retrieved from https://www.5g-vinni.eu/wp-content/uploads/2019/02/5g-vinni_d2.1_annex_a1_norway.pdf.
Cardenas et al., "Enhancing a 5G Network Slicing Management Model to Improve the Support of Mobile Virtual Network Operators," IEEE Access, vol. 9, 2021, pp. 131382-131399.

* cited by examiner

*Primary Examiner* — Mahran Y Abu Roumi
(74) *Attorney, Agent, or Firm* — Zilka-Kotab, P.C.

(57) ABSTRACT

As described herein, a system, method, and computer program are provided for a TOSCA modeling optimization for 5G network orchestration. A template catalog storing one or more network service instance templates is accessed, by a TOSCA-based orchestrator in a 5G network. A network service instance is deployed to the 5G network from the one or more network service instance templates, by the TOSCA-based orchestrator.

16 Claims, 5 Drawing Sheets

100

102 — access, by a TOSCA-based orchestrator in a 5G network, a template catalog storing one or more network service instance templates 104 — deploy, to the 5G network by the TOSCA-based orchestrator, a network service instance from the one or more network service instance templates

SYSTEM, METHOD, AND COMPUTER PROGRAM FOR A TOSCA MODELING OPTIMIZATION FOR 5G NETWORK ORCHESTRATION

FIELD OF THE INVENTION

The present invention relates to TOSCA based orchestration in a 5G network.

BACKGROUND

One of the major trends in 5G network technology is the zero-touch automation of network management. In current systems that use TOSCA-based orchestration for this automation, the TOSCA service templates are modeled by a design tool and kept in a template catalog. When a service (or resource) life-cycle management (LCM) operation is needed in run-time (e.g. requested by network events such as traffic degradation, customers gathering, etc.), the TOSCA-based orchestrator provides the LCM operation (e.g. scaling out, heal, etc.) down to the network infrastructure. The LCM operations typically include multiple network configuration operations in addition to cloud infrastructure manipulation commands.

Based on the above, the LCM operations may introduce a huge latency of minutes to dozens of minutes. The translation from service template to service instance require the orchestrator to perform multiple time consuming operations in order to gather needed instance data: policy, inventory lookup, etc. This latency is unacceptable for 5G network automation.

There is thus a need for addressing these and/or other issues associated with the prior art. For example, in order to provide the above mentioned automation, there should be a way to accelerate a widely used TOSCA based orchestration standardized by European Telecommunications Standards Institute (ETSI) Network Function Virtualization (NFV) and the OASIS TOSCA community. Therefore, there is a need from 5G Service providers to optimize a TOSCA based orchestration of a 5G Network, especially in a 5G RAN domain where the LCM operation produces a significant latency.

SUMMARY

As described herein, a system, method, and computer program are provided for a TOSCA modeling optimization for 5G network orchestration. A template catalog storing one or more network service instance templates is accessed, by a TOSCA-based orchestrator in a 5G network. A network service instance is deployed to the 5G network from the one or more network service instance templates, by the TOSCA-based orchestrator.

DETAILED DESCRIPTION

The present description relates to the implementation of a TOSCA-based orchestrator for a 5G network. The TOSCA (Topology and Orchestration Specification for Cloud Applications) orchestrator is a network controller, modeled using TOSCA, that performs orchestration operations in the 5G network. Typically, the TOSCA-based orchestrator will use service templates from an existing service catalog to create new network service instances in the 5G network at run-time, as needed.

However, creating a new network service instance from a service template requires a translation from service template to service instance. This translation, in turn, require the orchestrator to perform multiple time consuming operations in order to gather needed instance data, such as policy data and inventory data, which introduces latency to the 5G network orchestration. Accordingly, the present disclosure provides a TOSCA modeling optimization for 5G network orchestration to allow for reduced latency in deploying network service instances to the 5G network.

Figure 1:
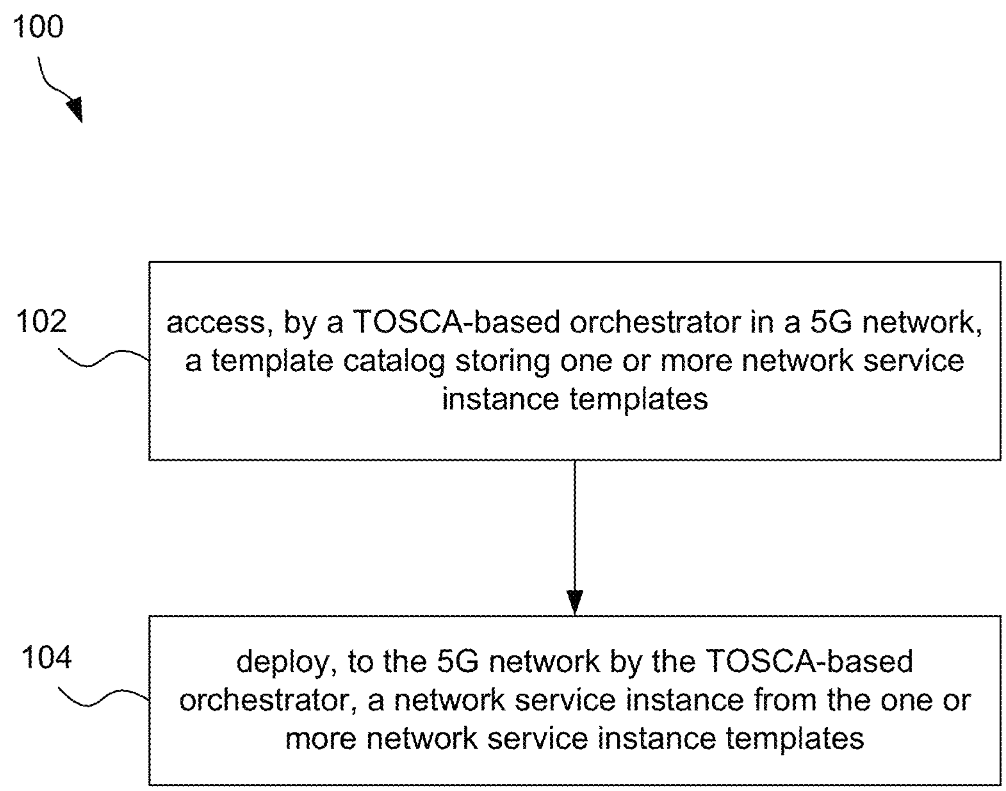
FIG. 1 illustrates a method for a TOSCA modeling optimization for 5G network orchestration, in accordance with one embodiment.

FIG. 1 illustrates a method for a TOSCA modeling optimization for 5G network orchestration, in accordance with one embodiment. The method 100 may be carried out by a computer system implementing a TOSCA-based orchestrator, such as that described below with respect to FIGS. 4 and/or 5.

In operation 102, a template catalog storing one or more network service instance templates is accessed, by a TOSCA-based orchestrator in a 5G network. With respect to the present description, the template catalog is repository storing templates for use by the TOSCA-based orchestrator. As mentioned, the template catalog stores one or more network service instance templates. As an option, the one or more network service instance templates may be stored in a run-time inventory of the service catalog.

A network service instance template refers to a template of a network service instance, where the template is complete with all configuration information, data, etc. required directly deploy a network service instance in the 5G network from the template. In an embodiment, each network service instance template may be modeled by a user using a design tool, or may be modeled from an existing network service instance deployed to the 5G network.

In an embodiment, the template catalog may also store service templates (e.g. modeled by a user using a design tool). These service templates can be used by the TOSCA-based orchestrator to create a new network service instance in the 5G network, but require additional translation operations by the TOSCA-based orchestrator to gather needed instance data, such as policy data and inventory data. Thus, a service template is not considered "complete" with all configuration information, data, etc. required directly deploy a network service instance in the 5G network from the template.

In an embodiment, the one or more network service instance templates stored in the template catalog may include templates for one or more network service instances predefined as commonly needed for the 5G network. A network service instance may be considered "commonly needed" when a frequency in which a network service instance is deployed to the network is above a defined threshold, for example. Thus, network service instance templates may be stored for more frequently deployed network service instances versus those that are less frequently deployed (which can be deployed instead using a service template described above).

In one embodiment, the template catalog may be accessed when a LCM operation is needed in run-time of the 5G network. The LCM operation may be for a service and/or resource in the 5G network. In an embodiment, the LCM operation may be to change an infrastructure of the 5G network. For example, the LCM operation may include multiple network configuration operations in addition to cloud infrastructure manipulation commands. In various embodiments, the LCM operation may include scaling in or out (e.g. augment the capacity, usually does not require a new deployment), healing (e.g. repair, sometimes implemented as un-deploy and/or deploy, deploying (e.g. create a resource or service on the network), un-deploying (e.g. delete a resource or service from the network), etc. operations.

In an embodiment, the LCM operation may be triggered by a particular network event. The particular network event may be traffic degradation and/or customers gathering, just by way of example. Of course, however, the particular network event may be any event occurring the network for which orchestration within the 5G network is required. For example, one or more policies may be defined which indicate which LCM operations are triggered by which network events.

In operation 104, a network service instance is deployed to the 5G network from the one or more network service instance templates, by the TOSCA-based orchestrator. The network service instance refers to a functioning instance of the network service. In the context of the LCM operation described above, the LCM operation may be satisfied by deploying the network service instance to the 5G network. In other words, any sub-operations of the LCM operation may not be required to be performed since the deployment of the network service instance to the 5G network accomplishes the same result in the 5G network.

As mentioned above, the network service instance is deployed directly from a network service instance template stored in template catalog. In an embodiment, the TOSCA-based orchestrator retrieves a network service instance template from the one or more network service instance templates stored in the template catalog for use in deploying the network service instance. In this case, the network service instance may be deployed directly from the retrieved network service instance template.

To this end, deploying the network service instance from the one or more network service instance templates may allow the TOSCA-based orchestrator to avoid creating a new network service instance in real-time. As mentioned above, creating a new network service instance in real-time may require using a service template from the service catalog and performing multiple operations to gather needed instance data including policy data and inventory data. For this reason, deploying the network service instance from the one or more network service instance templates may reduce latency of the 5G network otherwise incurred from creating the new network service instance in real-time. In other words, deploying a network service instance from a network service instance template may involve less latency than deploying a network service instance from a service template, for the reasons noted above.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
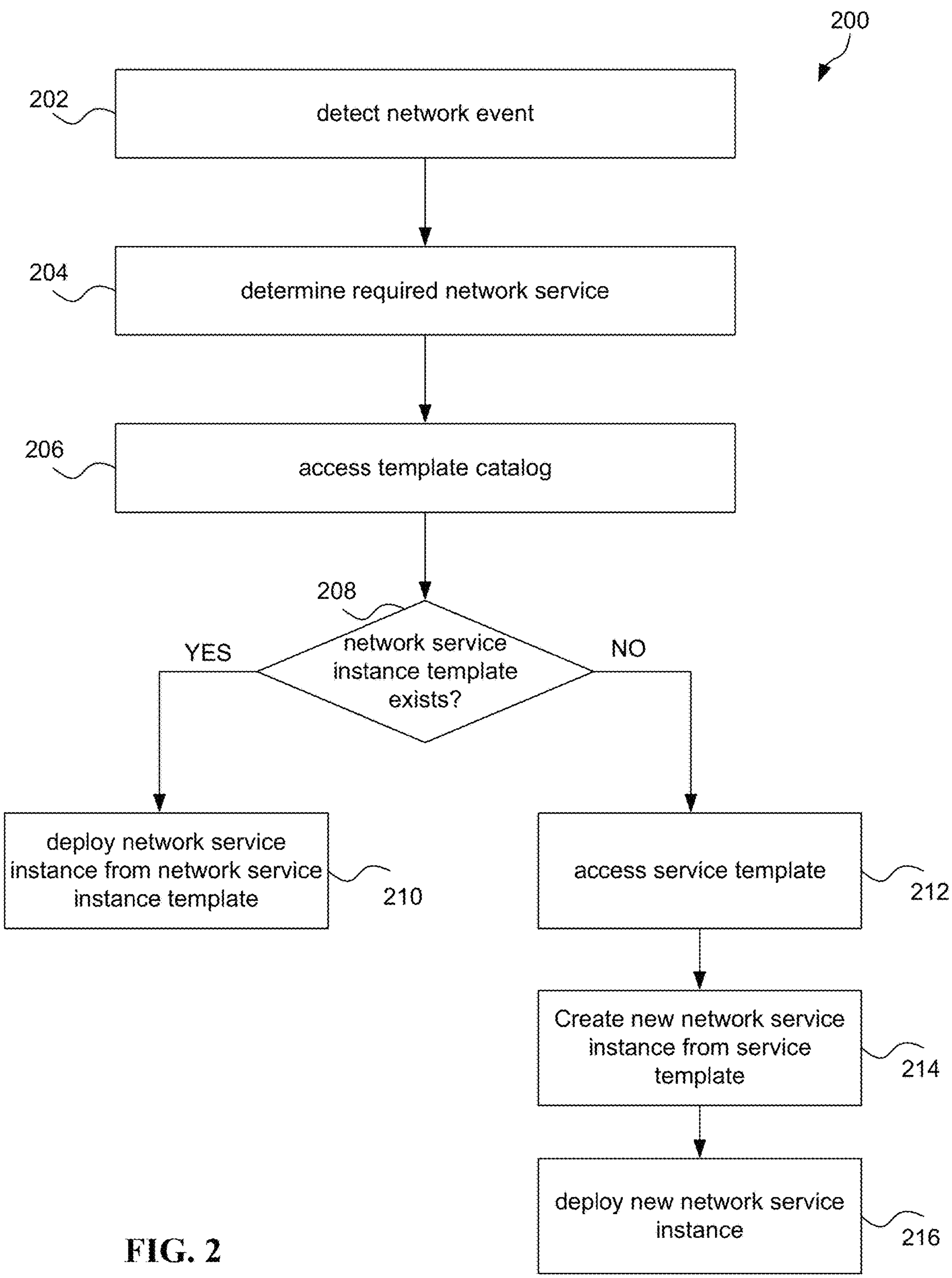
FIG. 2 illustrates a method for deploying a network service in a 5G network from a TOSCA serviced catalog, in accordance with one embodiment.

FIG. 2 illustrates a method 200 for deploying a network service in a 5G network from a TOSCA serviced catalog, in accordance with one embodiment. The method 200 may be performed by a TOSCA-based orchestrator operating in the 5G network.

In operation 202, a network event is detected. The network event may be detected based on a monitoring of events in the network. The network event may be predefined (e.g. in a network policy) as requiring a LCM operation.

In operation 204, a required network service is determined. The required network service refers to a network service that satisfies the LCM operation.

In operation 206, a template catalog is accessed. The template catalog stores both service templates and network service instances templates. Both the service templates and network service instances templates may be defined by a user using a design tool.

In decision 208, it is determined whether a network service instance template exists for the required network service. Responsive to determining that a network service instance template exists for the required network service, a network service instance is deployed in the 5G network from the network service instance template (see operation 210).

On the other hand, responsive to determining that a network service instance template does not exist for the required network service, a service template is accessed (operation 212). In operation 214, a new network service instance is created from the service template, including gathering any policy information, data, etc. required to create the new network service instance. In operation 216, the new network service instance is deployed to the 5G network.

Figure 3:
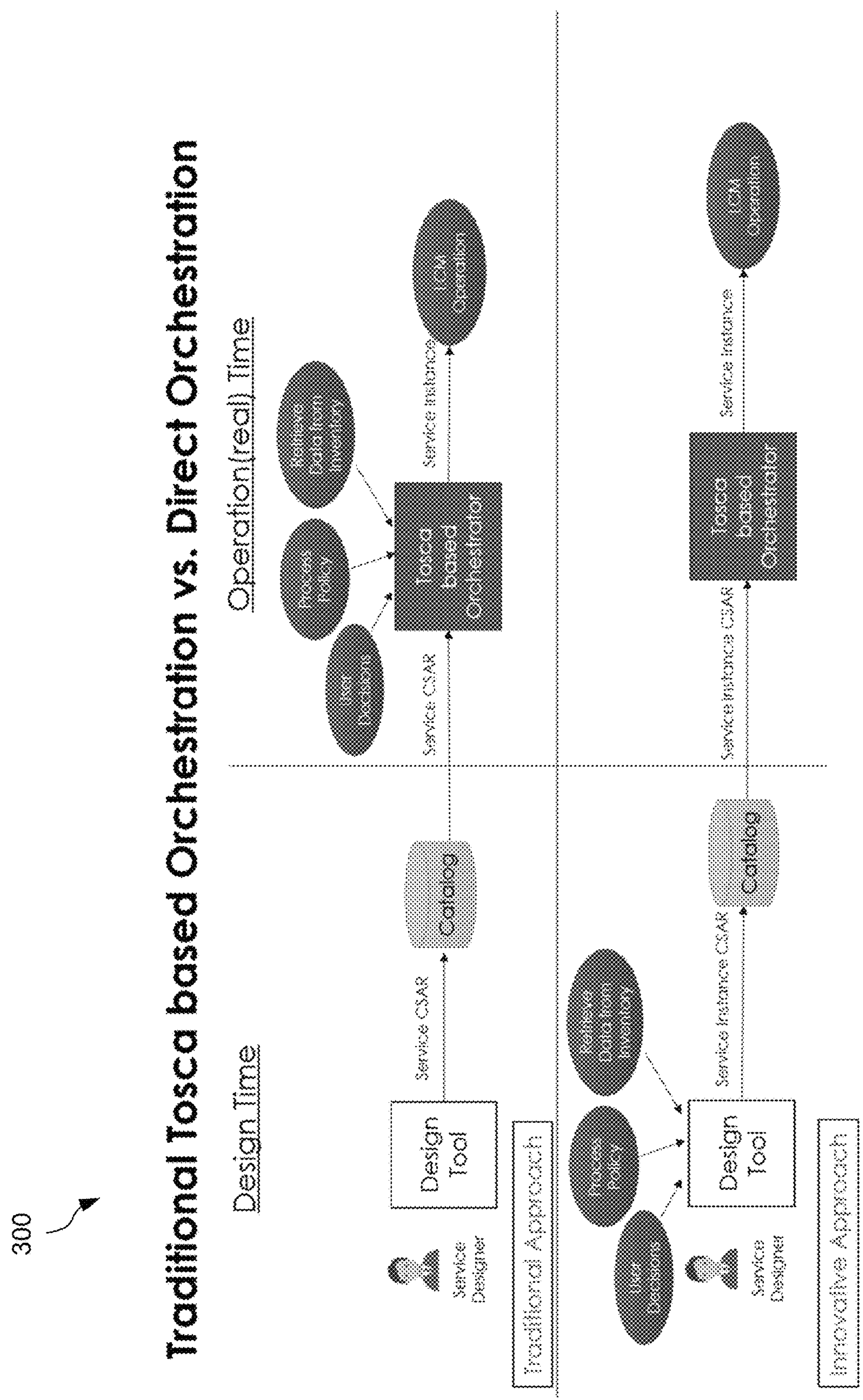
FIG. 3 illustrates a system for providing a TOSCA modeling optimization for 5G network orchestration, in accordance with one embodiment.

FIG. 3 illustrates a system 300 for providing a TOSCA modeling optimization for 5G network orchestration, in accordance with one embodiment.

As shown, the traditional approach to service catalogs used by TOSCA-based orchestrators for 5G network orchestration is for a user to use a design tool to create service templates which are then stored in the service catalog during design time. During run-time in the 5G network, the TOSCA-based orchestrator retrieves a service template from the service catalog, as needed, and then creates a new network service instance from the service template and other information gathered at run-time (e.g. user decisions, process policies, inventory data, as shown). The TOSCA-based orchestrator then deploys the new network service instance to the 5G network to satisfy a LCM operation in the 5G network.

In addition to this traditional approach, an innovative approach to the service catalog is disclosed herein. As shown, during design time, a user uses a design tool to create a network service instance template which includes information gathered at design time (e.g. user decisions, process policies, inventory data, as shown). The network service instance template is then stored in the service catalog during design time. During run-time in the 5G network, the TOSCA-based orchestrator retrieves the network service instance template from the service catalog, as needed, and then deploys a network service instance to the 5G network directly from the network service instance template to satisfy a LCM operation in the 5G network.

Figure 4:
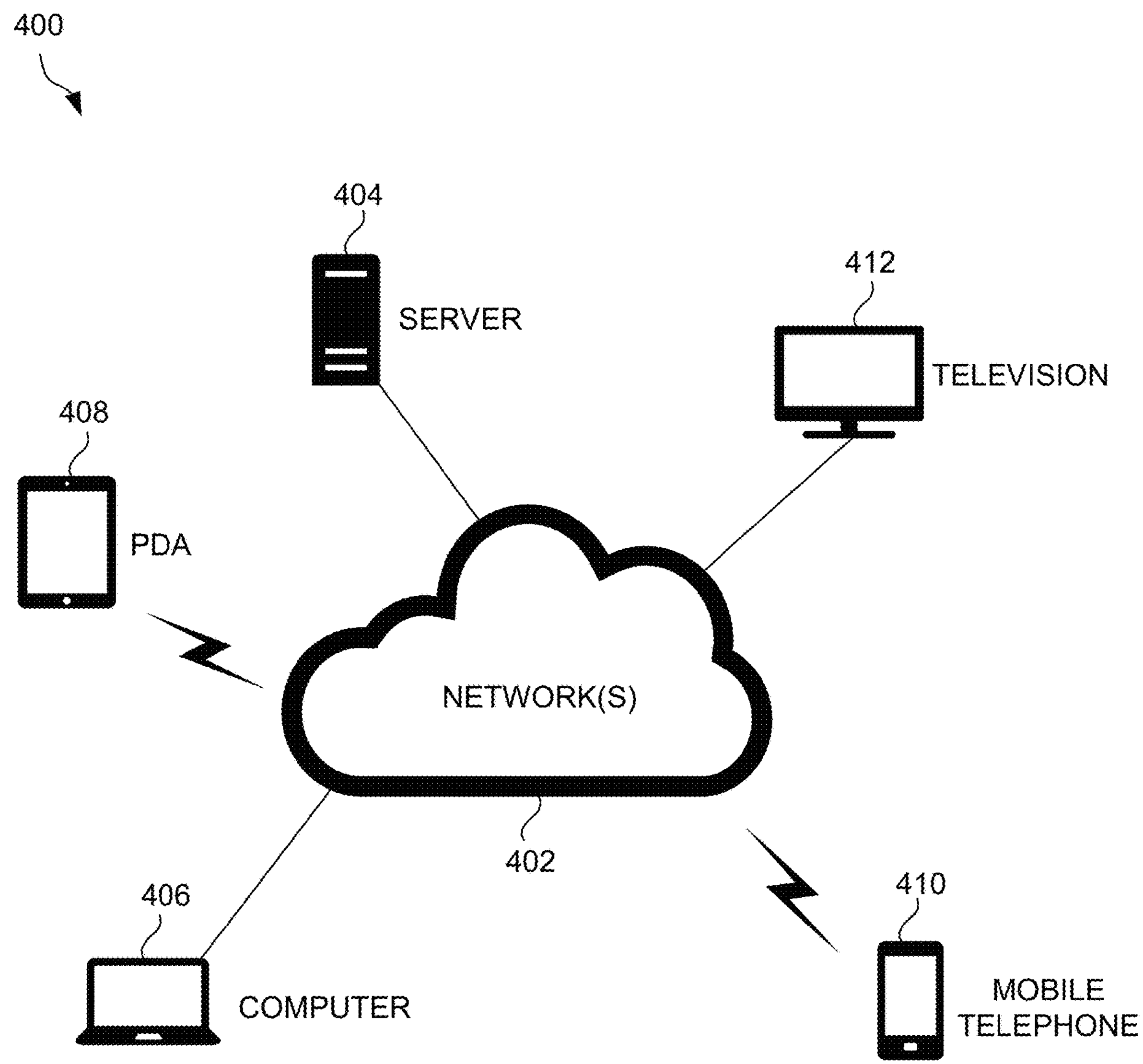
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
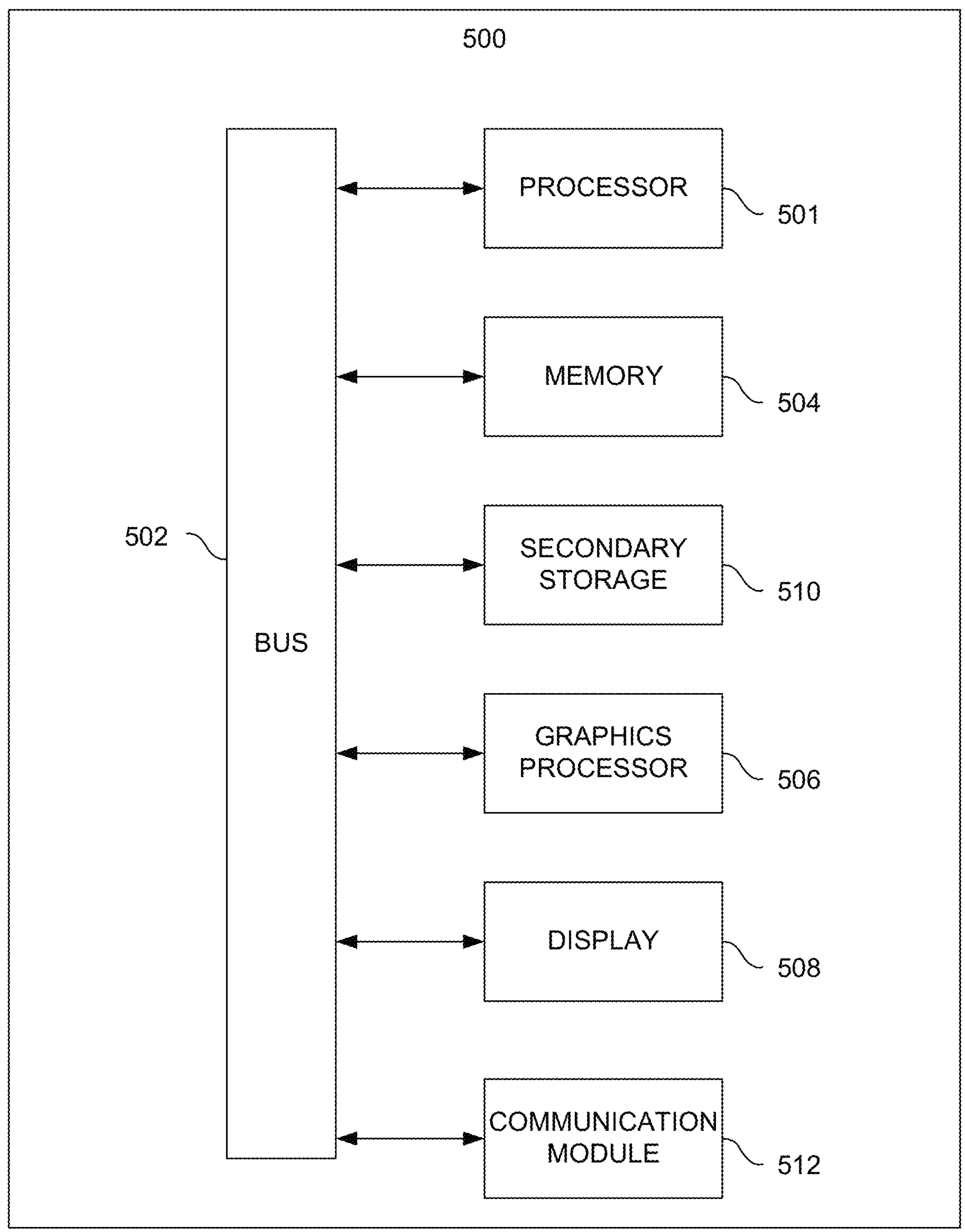
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

access, by a Topology and Orchestration Specification for Cloud Applications (TOSCA)-based orchestrator in a 5G network, a template catalog storing:

a plurality of preconfigured network service instance templates, each network service instance template of the plurality of preconfigured network service instance templates including complete configuration information and data required to directly deploy a corresponding network service instance in the 5G network from the preconfigured network service instance template;

detect a network event that triggers a preconfigured lifecycle management (LCM) operation required for the 5G network;

responsive to detecting the network event, determine one or more network service instances that, when deployed, will satisfy the LCM operation required for the 5G network;

retrieve, from the template catalog, one or more preconfigured network service instance templates that correspond to the determined one or more network service instances; and directly deploy, to the 5G network by the TOSCA-based orchestrator, the one or more network service instances from the one or more network service instance templates retrieved from the template catalog.

2. The non-transitory computer-readable media of claim 1, wherein the template catalog further stores service templates.

3. The non-transitory computer-readable media of claim 1, wherein the LCM operation is for a service in the 5G network.

4. The non-transitory computer-readable media of claim 1, wherein the LCM operation is for a resource in the 5G network.

5. The non-transitory computer-readable media of claim 1, wherein the LCM operation is to change an infrastructure of the 5G network.

6. The non-transitory computer-readable media of claim 5, wherein the LCM operation includes multiple network configuration operations in addition to cloud infrastructure manipulation commands.

7. The non-transitory computer-readable media of claim 1, wherein the LCM operation includes at least one of:

scaling out, or healing.

8. The non-transitory computer-readable media of claim 1, wherein the network event is at least one of:

traffic degradation, or customers gathering.

9. The non-transitory computer-readable media of claim 1, wherein the plurality of network service instance templates stored in the template catalog include templates for network service instances predefined as commonly needed for the 5G network.

10. The non-transitory computer-readable media of claim 1, wherein deploying the one or more network service instances from the one or more network service instance templates allows the TOSCA-based orchestrator to avoid creating a new network service instance in real-time.

11. The non-transitory computer-readable media of claim 10, wherein creating a new network service instance in real-time requires using a service template from the service catalog and performing multiple operations to gather needed instance data including policy data and inventory data.

12. The non-transitory computer-readable media of claim 11, wherein deploying the one or more network service instances from the one or more network service instance templates reduces latency of the 5G network otherwise incurred from creating the new network service instance in real-time.

13. The non-transitory computer-readable media of claim 1, wherein the plurality of network service instance templates are stored in a run-time inventory of the service catalog.

14. A method, comprising:

at a computer system:

accessing, by a Topology and Orchestration Specification for Cloud Applications (TOSCA)-based orchestrator in a 5G network, a template catalog storing:

a plurality of preconfigured network service instance templates, each network service instance template of the plurality of preconfigured network service instance templates including complete configuration information and data required to directly deploy a corresponding network service instance in the 5G network from the preconfigured network service instance template; detecting a network event that triggers a preconfigured lifecycle management (LCM) operation required for the 5G network;

responsive to detecting the network event, determining one or more network service instances that, when deployed, will satisfy the LCM operation required for the 5G network;

retrieving, from the template catalog, one or more preconfigured network service instance templates that correspond to the determined one or more network service instances; and directly deploying, to the 5G network by the TOSCA-based orchestrator, the one or more network service instances from the one or more network service instance templates retrieved from the template catalog.

15. A system, comprising:

a non-transitory memory storing instructions; and one or more processors in communication with the non-transitory memory that execute the instructions to:

access, by a Topology and Orchestration Specification for Cloud Applications (TOSCA)-based orchestrator in a 5G network, a template catalog storing:

a plurality of preconfigured network service instance templates, each network service instance template of the plurality of preconfigured network service instance templates including complete configuration information and data required to directly deploy a corresponding network service instance in the 5G network from the preconfigured network service instance template;

detect a network event that triggers a preconfigured lifecycle management (LCM) operation required for the 5G network;

responsive to detecting the network event, determine one or more network service instances that, when deployed, will satisfy the LCM operation required for the 5G network;

retrieve, from the template catalog, one or more preconfigured network service instance templates that correspond to the determined one or more network service instances; and directly deploy, to the 5G network by the TOSCA-based orchestrator, the one or more network service instances from the one or more network service instance templates retrieved from the template catalog.

16. The non-transitory computer-readable media of claim 1, wherein the template catalog further stores a plurality of preconfigured service templates, each service template of the plurality of preconfigured service templates including incomplete configuration information and data required to directly deploy a corresponding network service instance in the 5G network from the preconfigured service template, and wherein the device is further caused to:

detect a second network event that triggers a second preconfigured lifecycle management (LCM) operation required for the 5G network;

responsive to detecting the second network event, determine one or more second network service instances that, when deployed, will satisfy the second LCM operation required for the 5G network;

determine that the template catalog does have stored therein one or more second preconfigured network service instance templates that correspond to the determined one or more second network service instances;

retrieve, from the template catalog, one or more preconfigured service templates that correspond to the determined one or more second network service instances;

gather configuration information and data required to create the one or more second network service instances from the one or more preconfigured service templates;

create the one or more second network service instances from the one or more preconfigured service templates using the gathered configuration information and data; and deploy, to the 5G network by the TOSCA-based orchestrator, the created one or more second network service instances.

* * * * *